United States Patent [19]
Furlenmeier et al.

[11] 3,900,464
[45] Aug. 19, 1975

[54] 6-ACYL DERIVATIVES OF AMINOPENICILLANIC ACID

[75] Inventors: Andre Furlenmeier, Basel; Paul Lanz, Muttenz; Peter Quitt, Fullinsdorf, all of Switzerland; Karl Vogler, deceased, late of Riehen, Switzerland; by Franziska Vogler, heir, Riehen, Switzerland; by Niklaus E. Vogler, heir, Riehen, Switzerland; by Heinrich Vogler, heir, Riehen, Switzerland

[73] Assignee: Hoffmann-La Roche Inc., Nutley, N.J.

[22] Filed: Dec. 27, 1972

[21] Appl. No.: 318,728

[30] Foreign Application Priority Data
Jan. 12, 1972   Switzerland............................ 436/72

[52] U.S. Cl................................ 260/239.1; 424/271
[51] Int. Cl.²....................................... C07D 499/46
[58] Field of Search................................. 260/239.1

[56] References Cited
UNITED STATES PATENTS
3,767,645   10/1973   Treuner et al................... 260/239.1
FOREIGN PATENTS OR APPLICATIONS
880,042   10/1961   United Kingdom
900,666   7/1962   United Kingdom
989,882   4/1963   United Kingdom
1,312,147   4/1973   United Kingdom
1,195,755   2/1966   Germany
2,033,700   1/1972   Germany Primary Examiner—Nicholas S. Rizzo
Attorney, Agent, or Firm—Samuel L. Welt; Jon S. Saxe; R. Hain Swope

[57] ABSTRACT

Novel antibiotic compounds represented by the formula

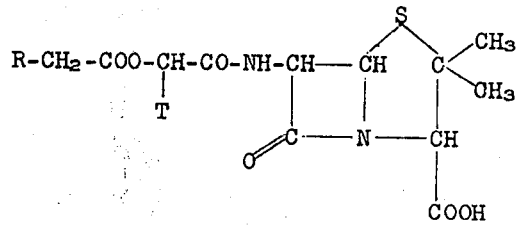

wherein R is a furyl, pyrrolyl, thienyl, oxazolyl, isoxazolyl, thiazolyl, pyridyl, pyrimidinyl, tetrazolyl or indolyl radical which can be substituted with halogen, $C_1$-$C_3$-alkyl, $C_1$-$C_3$-alkoxy or $C_1$-$C_3$-alkylthio and T is a $C_2$-$C_5$-alkyl group, pharmaceutically acceptable salts thereof and hydrates of such salts, a process for their preparation and novel intermediates thereof are disclosed.

4 Claims, No Drawings

6-ACYL DERIVATIVES OF AMINOPENICILLANIC ACID

DETAILED DESCRIPTION OF THE INVENTION

The present invention is directed to novel 6-acylaminopenicillanic acid compounds represented by the formula

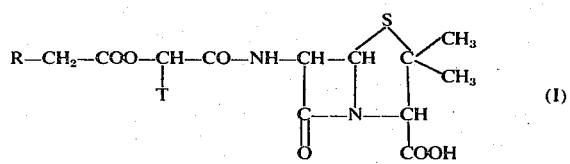

wherein R is a furyl, pyrrolyl, thienyl, oxazolyl, isoxazolyl, thiazolyl, pyridyl, pyrimidinyl, tetrazolyl or indolyl radical which can be substituted with halogen, $C_1$-$C_3$-alkyl, $C_1$-$C_3$-alkoxy or $C_1$-$C_3$-alkylthio and T is a $C_2$-$C_5$ alkyl group,
pharmaceutically acceptable salts thereof and hydrates of such salts.

The invention is also directed to the preparation of compounds represented by formula I utilizing the novel intermediate compounds represented by the formula

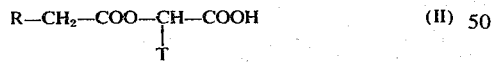

wherein R and T have the meanings given above and their reactive functional derivatives.

In accordance with the invention, the term "halogen" represents all the halogens with fluorine, bromine and chlorine preferred. Alkyl radicals represented by T in formulas I and II may be straight- or branched-chain radicals containing 2 to 5 carbon atoms. Examples of such substituents include ethyl, n-propyl, isopropyl, n-butyl, isobutyl, n-pentyl, 3-methylbutyl and neopentyl.

A preferred group of the 6-aminopenicillanic acids of formula I and novel intermediate acids of formula II in accordance with the invention are those wherein R is selected from the group consisting of 5-tetrazolyl, 1-methyl-1H-tetrazol-5-yl, 2-thienyl, 3-thienyl, 3-indolyl, 2-isopropyl-2H-tetrazol-5-yl, 5-methyl-2H-tetrazol-2-yl, 5-methyl-1H-tetrazol-1-yl, 2-methyl-2H-tetrazol-5-yl, 1-isopropyl-1H-tetrazol-5-yl, 2-furyl, 2-pyrrolyl and 3-pyridyl groups, pharmaceutically acceptable salts thereof and hydrates of such salts.

A particularly preferred group of penicillin compounds in accordance with the invention are set forth in the following Table. In the Table, the antimicrobial activity of the compounds tested is expressed in terms of the minimal inhibitory concentration in mg./ml. The minimal inhibitory concentration was determined by double dilution series in nutrient bouillon. The activity of the compounds was further demonstrated in vivo by establishing an oral $CD_{50}$ in the mouse against *Staphylococcus aureous* and *Escherichia coli*.

TABLE

| Compound | Minimum Inhibitory Concentration [µg/ml] | | $CD_{50}$ per os in the mouse [mg./kg.] | |
|---|---|---|---|---|
|  | S. aureous FDA | E. Coli 1346 | S. aureous (Schoch) | E. Coli 1346 |
| A | 0.312 | 19 | 2.5 | 54 |
| B | 0.312 | 19 | 5.7 | 43 |
| C | 0.625 | 10 | 2.9 | 83 |
| D | 0.312 | 19 | 5.7 | 43 |
| E | 0.312 | 19 | 2.8 | 26 |
| F | 0.312 | 19 | 2.5 | 54 |
| G | 0.156 | 39 | 0.8 | 22 |
| H | 0.156 | 19 | 0.9 | 15 |
| I | 0.312 | 78 | 2.0 | 32 |
| J | 0.156 | 10 | 2.1 | 16 |
| K | 0.156 | 19 | 3.1 | 22 |
| L | 0.312 | 10 | 4.6 | >93 | wherein the compounds tested are as follows:

| Compound | Name |
|---|---|
| A | [(R)-1-[(2-isopropyl-2H-tetrazol-5-yl)acetoxy]-3-methylbutyl]penicillin sodium |
| B | [(R)-3-methyl-1-[(5-methyl-2H-tetrazol-2-yl)acetoxy]butyl]penicillin sodium |
| C | [(R)-3-methyl-1-[(1-methyl-1H-tetrazol-5-yl)acetoxy]butyl]penicillin sodium |
| D | [(R)-3-methyl-1-[(5-methyl-1H-tetrazol-1-yl)acetoxy]butyl]penicillin sodium |
| E | [(R)-3-methyl-1-[(2-methyl-2H-tetrazol-5-yl)acetoxy]butyl]penicillin sodium |
| F | [(R)-1-[(1-isopropyl-1H-tetrazol-5-yl)acetoxy]-3-methylbutyl]penicillin sodium |
| G | [(R)-1-[(2-furyl)acetoxy]-3-methylbutyl]penicillin sodium |
| H | [(R)-3-methyl-1-[(2-thienyl)acetoxy]butyl]penicillin sodium |
| I | [(R)-3-methyl-1-[(3-thienyl)acetoxy]butyl]penicillin sodium |
| J | [(R)-3-methyl-1-[(pyrrol-1-yl)acetoxy]butyl]pencillin sodium |
| K | [(R)-3-methyl-1-[(3-indolyl)acetoxy]butyl]penicillin sodium |
| L | [(R)-3-methyl-1-[(3-pyridyl)acetoxy]butyl]pencillin sodium |

In accordance with the present invention, the compounds represented by formula I are prepared by reacting 6-aminopenicillanic acid, the carboxyl group of which is in a protected form, with the novel acids represented by formula II or a reactive functional derivative thereof. Such reactive functional derivatives include, for example: halides, e.g. chlorides, bromides or fluorides; azides; anhydrides-particularly mixed anhydrides with strong acids; reactive esters such as the N-hydroxysuccinimide esters; amides such as imidazolides and the like. After the reaction is completed, the protecting group is cleaved off and, if desired, the product is converted into a pharmaceutical salt.

Examples of methods whereby the carboxyl of 6-aminopenicillanic acid can be protected include conversion into a readily cleavable ester such as, for example, the benzyl ester, a p-bromophenacyl ester or a silyl ester such as the trimethyl silyl ester, or by salt formation with an inorganic base or a tertiary organic base such as, for example, triethylamine. When the reaction of 6-aminopenicillanic acid and the acid represented by formula II is completed, the ester protecting group can be easily removed by methods known in the art. For example, a benzyl ester protecting group can be removed by catalytic hydrogenation utilizing a noble metal catalyst such as palladium-carbon, a p-bromophenacy ester group can be cleaved by means of treatment with an alkali metal thiophenolate and a silyl ester can readily be removed by treatment with water. When the carboxyl group is protected by salt formation, e.g., with triethylamine, cleavage is accomplished via treatment with acid at low temperatures, i.e., a temperature of from about 0°C. to about 10°C. Suitable acids include, for example, inorganic acids such as hydrochloric, sulfuric and phosphoric acids and organic acids such as citric acid and the like.

The reaction of 6-aminopenicillanic acid having a protected carboxyl group and the compound represented by formula II is carried out by methods well known in the art of peptide chemistry. Thus, for example, the reaction is effected in the presence of a carbodiimide such as dicyclohexylcarbodiimide or an oxazolium salt such as N-ethyl-5-phenyl-isoxazolium-3'-sulfonate in an inert solvent. Suitable solvents include, for example, ethyl acetate, acetonitrile, dioxan, chloroform, methylene chloride, benzene, dimethylformamide and the like. In a like manner, a salt of a 6-aminopenicillanic acid such as, for example, a trialkylammonium salt is reacted with a reactive functional derivative of an acid represented by formula II in an inert solvent such as described above. The reactions are conveniently carried out at a temperature between about 5°C. and about −40°C. preferably at about 0°C.

The novel penicillin compounds represented by formula I, pharmaceutical salts thereof and the acids represented by formula II can be present as optically pure isomers and as diastereometric mixtures. The R-enantiomers, i.e., the acids of formula II and the compounds of formula I wherein the group

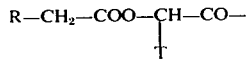

wherein R and T are as defined above has the R configuration are preferred.

The novel acids represented by formula II can be prepared by treating a compound represented by the formula

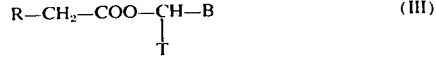

wherein R and T have the meanings given above and B is a protected carboxyl group
to convert it to the free carboxyl group.

The protected carboxyl group represented by B can be, for example, a readily cleavable ester group such as the benzyl ester of the t-butyl ester. The removal of the protecting group from the carboxyl can be carried out in the case of the benzyl group by catalytic hydrogenation utilizing a noble metal catalyst such as palladium/-carbon and in the case of the t-butyl ester by acid hydrolysis utilizing a mineral acid such as hydrochloric acid, an organic acid such as trifluoroacetic acid and the like. The conversion of the thus-obtained acid into reactive functional derivatives such as described above can be carried out by methods known in the art.

The compounds represented by formula III can be prepared by methods well known in the art. For example, the carboxyl group of a compound represented by the formula

where T has the meaning given above can be protected by conventional methods, e.g. by formation of the benzyl ester or t-butyl ester, and the resulting compound reacted with a compound represented by the formula

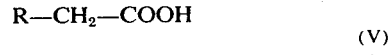

where R has the meaning given above, for example, in the presence of benzenesulfonyl chloride.

The novel 6-acylaminopenicillanic acid compounds provided by the present invention possess a broad spectrum of activity against both gram-positive and gram-negative micro-organisms. Their antibiotic and bacteriocidal activity allows them to be utilized both therapeutically and as disinfectants. It is preferred in accordance with the invention to administer the novel penicillin compounds described herein orally in view of their superior stability against gastric acid. It is contemplated in the case of adults, that oral dosage forms containing 200–600 mg. are administered three or four times daily. This dosage regimen may be adjusted by the clinician as the therapeutic situation requires. The novel penicillin compounds of the invention may also be administered parenterally, rectally or topically in suitable dosage forms and may be administered in the form of their pharmaceutically acceptable salts or hydrates.

Examples of the pharmaceutically acceptable salts of the penicillin compounds represented by formula I include salts with inorganic bases such as, for example, the alkali metal salts, for example, the sodium or potassium salt, ammonium salts, alkaline earth metal salts such as, for example, the calcium salt and the like and salts with organic bases such as amine compounds, for example, N-ethyl piperidine, procaine, dibenzylamine, N,N'-dibenzylethyl-ethylenediamine, alkylamines, dialkylamines or the like. These salts can also be hydrated. The hydration can be effected during the manufacturing process or can occur gradually as a consequence of the hygroscopic properties of an initially anhydrous salt.

For purposes of administration, the novel acyl derivatives of 6-aminopenicillanic acid of the present invention can be combined with conventional compatible organic or inorganic pharmaceutical carrier materials known in the art. Such materials include, for example, water, gelatin, gums, lactose, starches, magnesium stearate, talc, vegetable oils, polyalkylene glycols, petroleum jelly and the like. Such pharmaceutical preparations may be in unit dosage form and may additionally contain other therapeutically valuable substances or conventional pharmaceutical adjuvants such as preservatives, stabilizing agents, wetting agents, emulsifying agents, buffers and the like. The pharmaceutical preparations can be in conventional solid dosage forms such as tablets, capsules, dragees and the like, conventional semi-solid forms such as ointments and creams, conventional liquid forms such as solutions, suspensions, emulsions and the like and other conventional dosage forms such as dry ampules, suppositories and the like. Such preparations may be submitted to conventional pharmaceutical expedients such as, for example, sterilization and the like.

The following Examples further illustrate the invention. All temperatures are in degrees Centigrade.

EXAMPLE 1

Fifteen grams of 2-isopropyl-5-tetrazolylacetic acid and 17.8 g. of (R)-2-hydroxyisocaproic acid benzyl ester were dissolved in 250 ml. of pyridine. The solution was cooled to 0°, treated with 11.6 ml. of benzenesulphonyl chloride and stirred at room temperature for 4 hours. To this solution was then added 10 ml. of water dropwise at −15°. After 5 minutes, the solution was poured into 2 litres of high-boiling petroleum ether and washed, in turn, with water, dilute hydrochloric acid, water, sodium carbonate solution and water. The solution was then dried over magnesium sulfate and concentrated. The oily residue was hydrogenated in 500 ml. of methanol with the addition of 3 g. palladium/carbon. After removal of the catalyst, the solution was concentrated, the residue dissolved in ether and (R)-2-[(2-isopropyl-2H-tetrazol-5-yl)acetoxy]isocaproic acid shaken out with potassium bicarbonate solution. The latter solution was acidified with dilute hydrochloric acid and the precipitated acid taken up in ether. After washing with water, the mixture was dried over magnesium sulfate and concentrated to yield (R)-2-[(2-isopropyl-2H-tetrazol-5-yl)acetoxy]isocaproic acid in the form of a colorless oil.

A total of 19.8 g. of (R)-2-[(2-isopropyl-2H-tetrazol-5-yl)acetoxy]-isocaproic acid thus-formed were heated to 60° for 1 hour in 200 ml. of benzene and 100 ml. of thionyl chloride. The mixture was subsequently concentrated and azeotropically distilled 4 times with benzene. The (R)-2-[(2-isopropyl-2H-tetrazol-5-yl)acetoxy]isocaproic acid chloride thus-formed was dissolved in 100 ml. of methylene chloride and added dropwise at 0°, with stirring, to a solution of 17.3 g. of 6-aminopenicillanic acid in 250 ml. of methylene chloride and 33 ml. of triethylamine. After 1 hour, the mixture was concentrated at 25° and the residue taken up in water. The resulting aqueous solution was washed with ether and then acidified to pH 2 with dilute hydrochloric acid with ice-cooling. The precipitated acid was taken up in ether, the solution washed with water, dried and concentrated. The residue was dissolved in a small amount of ethyl acetate and treated at 0° with 33 ml. of a 2-N solution of sodium 2-ethylcaproate in ethyl acetate. The resulting sodium salt was precipitated with isopropyl ether, filtered off and recrystallized from isopropanol/water to yield [(R)-1-[(2-isopropyl-2H-tetrazol-5-yl)acetoxy]-3-methylbutyl]-penicillin sodium; melting point 175°; $[\alpha]_D^{25} = +232°$ ($c = 1$ in water).

EXAMPLE 2

A total of 11.3 g. of (R)-2-[(5-methyl-2H-tetrazol-2-yl)acetoxy]-isocaproic acid prepared via its benzyl ester as in Example 1 was dissolved in 500 ml. of tetrahydrofuran and 6.3 ml. of triethylamine and treated at 0° with 5.8 ml. of chloroformic acid isobutyl ester. After 30 minutes, a solution of 10.8 g. of 6-aminopenicillanic acid in 100 ml. of methylene chloride and 14 ml. of triethylamine was added thereto and the mixture stirred for 1 hour at 0°. The mixture was subsequently filtered and the filtrate concentrated at 25°. The residue was taken up in water and the resulting aqueous solution washed with ether and adjusted to pH 2 with dilute hydrochloric acid with ice-cooling. The precipitated acid was taken up in ethyl acetate and the resulting solution washed with water, dried and concentrated. The residue was dissolved in a small amount of ethyl acetate, treated at 0° with 22 ml. of a 2-N solution of sodium 2-ethylcaproate in ethyl acetate and the sodium salt precipitated with isopropyl ether. The mixture was filtered and the residue recrystallized from isopropanol/water to yield [(R)-3-methyl-1-[(5-methyl-2H-tetrazol-2-yl)acetoxy]butyl]-penicillin sodium; melting point 172°–173°; $[\alpha]_D^{25} = +250°$ ($c = 1$ in water).

EXAMPLE 3

In a manner analogous to that described in Example 1 there was obtained from (R)-2-[(1-methyl-1H-tetrazol-5-yl)-acetoxy]isocaproic acid, prepared via its benzyl ester, [(R)-3-methyl-1-[(1-methyl-1H-tetrazol-5-yl)acetoxy]butyl]-penicillin sodium; melting point 160°; $[\alpha]_D^{25} = +181°$ ($c = 1$ in water).

EXAMPLE 4

In a manner analogous to that described in Example 1 there was obtained from (R)-2-[(5-methyl-1H-tetrazol-1-yl)-acetoxy]isocaproic acid, prepared via its benzyl ester, [(R)-3-methyl-1-[(5-methyl-1H-tetrazol-1-yl)acetoxy]butyl]-penicillin sodium; melting point 177°, $[\alpha]_D^{25} = +235°$ ($c = 1$ in water).

EXAMPLE 5

In a manner analogous to that described in Example 2 there was obtained from (R)-2-[(2-methyl-2H-tetrazol-5-yl)acetoxy]isocaproic acid, prepared via its benzyl ester, [(R)-3-methyl-1-[(2-methyl-2H-tetrazol-5-yl)acetoxy]butyl]-penicillin sodium; melting point 171°; $[\alpha]_D^{25} = +241°$ ($c = 1$ in water).

EXAMPLE 6

In a manner analogous to that described in Example 2 there was obtained from (R)-2-[(1-isopropyl-1H-tetrazol-5-yl)-acetoxy]isocaproic acid, prepared via its benzyl ester, [(R)-1-[(1-isopropyl-1H-tetrazol-5-yl)acetoxy]-3-methylbutyl]-penicillin sodium; melting point 115°; $[\alpha]_D^{25} = +158°$ ($c = 1$ in water).

EXAMPLE 7

In a manner analogous to that described in Example 2 there was obtained from (R)-2-[(2-furyl)acetoxy]isocaproic acid, prepared via its benzyl ester, [(R)-1-[(2-furyl)acetoxy]-3-methylbutyl]-penicillin sodium; melting point 163°–164°; $[\alpha]_D^{25} = +246°$ ($c = 1$ in water).

EXAMPLE 8

A total of 4.7 g. of thiophen-2-acetic acid and 5.64 g. of (R)-2-hydroxyisocaproic acid tertbutyl ester were cooled in 100 ml. of pyridine to 0° and treated with 4.58 ml. of benzenesulfonyl chloride. The resulting mixture was stirred for 3 hours at room temperature, cooled to −15° and treated with 10 ml. of water. After 5 minutes, the solution was poured into 1 liter of petroleum ether, the pyridine washed out with water and the resulting solution dried and concentrated. The oil thus-obtained was dissolved in 50 ml. of toluene and cooled to 0°. The mixture was treated with 100 ml. of trifluoroacetic acid and allowed to stand at room temperature for 3 hours. The mixture was then concentrated and azeotropically distilled 3 times with toluene. The residue was taken up in ether and the product, (R)-2-[(2-thienyl)acetoxy]isocaproic acid, extracted with aqueous sodium bicarbonate solution. Thereafter, the acid was again liberated with dilute hydrochloric acid. The mixture was shaken out with ether, washed with water, dried and concentrated to yield, as the residue, (R)-2-[(2-thienyl)acetoxy]isocaproic acid in the form of a yellowish oil.

The (R)-2-[(2-thienyl)acetoxy]isocaproic acid thus-formed was utilized to prepare [(R)-3-methyl-1-[(2-thienyl)acetoxy]butyl]-penicillin sodium; melting point 196°–199°; $[\alpha]_D^{25} = +238°$ ($c = 1$ in water) in a manner analogous to that described in Example 2.

EXAMPLE 9

In a manner analogous to that described in Example 2 there was obtained from (R)-2-[(3-thienyl)acetoxy]isocaproic acid, formed via its t-butyl ester as described in Example 8, [(R)-3-methyl-1-[(3-thienyl)acetoxy]butyl]-penicillin sodium; melting point 180°–182°; $[\alpha]_D^{25} = +234°$ ($c = 1$ in water).

EXAMPLE 10

In a manner analogous to that described in Example 2 there was obtained from (R)-2-[(pyrrol-1-yl)acetoxy]isocaproic acid, prepared via its benzyl ester, [(R)-3-methyl-1-[(pyrrol-1-yl)acetoxy]butyl]-penicillin sodium; melting point 181°–183°; $[\alpha]_D^{25} = +261°$ ($c = 1$ in water).

EXAMPLE 11

A total of 12.2 g. of 3-indolylacetic acid was treated in 160 ml. of tetrahydrofuran with 10.8 ml. of triethylamine and cooled to between −50° and −60°. With vigorous stirring there was slowly added thereto a solution of 45 ml. of a 2-N phosgene solution in toluene, the mass becoming viscous and reddish. After 15 minutes, the mixture was poured at −50° with stirring into a solution, cooled to about −40° of 11.1 g. of (R)-2-hydroxyisocaproic acid benzyl ester in ml. of The mixture was allowed to warm to 0° and maintained at that temperature for 16 hours. The solution was thereafter evaporated under reduced pressure, taken up in ether, washed with water, 3-N citric acid and again with water, stirred for 30 minutes with animal carbon, dried over sodium sulfate and, after filtration under reduced pressure, evaporated at 20°. The residual oil was chromatographed over 500 g. of silicagel and eluted with benzene/ethyl acetate (4:1). There was obtained an oil which was hydrogenated in 100 ml. of methanol with 5% palladium/carbon. After filtration and evaporation of the solvent under reduced pressure, the residue was chromatographed on 200 g. of silicagel using benzene/ethyl acetate (1:1) to yield (R)-2-[(3-indolyl)acetoxy]isocaproic acid.

In a manner analogous to that described in Example 2 there was obtained the thus-formed (R)-2-[(3-indolyl)acetoxy]isocaproic acid [(R)-3-methyl-1-[(3-indolyl)acetoxy]butyl]-penicillin sodium; melting point 205°–207°; $[\alpha]_D^{25} = +175.8°$ ($c = 1$ in water).

EXAMPLE 12

A total of 15.7 g. of (R)-2-[(3-pyridyl)acetoxy]isocaproic acid, formed via its benzyl ester in a manner analogous to that described in Example 1, was dissolved in 800 ml. of tetrahydrofuran and 12 ml. of triethylamine. The solution was cooled to −15° and treated with 20 ml. of a 20% solution of phosgene in toluene. After 1 hour, the solution was concentrated at 20° to half of its volume and then treated at 0° with a solution of 15.2 g. of 6-aminopenicillanic acid in 240 ml. of methylene chloride and 20 ml. of triethylamine. After 2 hours, the mixture was concentrated to dryness at 20°. The residue was dissolved in water and the aqueous solution washed with ethyl acetate. Thereafter, the mixture was adjusted to pH 2.5 with citric acid and the acid shaken out with ethyl acetate. After washing with water, the solution was dried over magnesium sulfate, concentrated to a small volume and treated with 7.8 ml. of a 2-N solution of sodium 2-ethylcaproate in ethyl acetate. The [(R)-3-methyl-1-[(3-pyridyl)acetoxy]butyl]-penicillin sodium was precipitated with ether and recrystallized from aceton/ethyl acetate; melting point 200°; $[\alpha]_D^{25} = +272°$ ($c = 1$ in water).

EXAMPLE 13

The following composition was prepared and filled into gelatin capsules:

| | |
|---|---|
| [(R)-1-[(2-isopropyl-2H-tetrazol-5-yl)acetoxy]-3-methylbutyl]-penicillin sodium | 520 mg. |
| Luviskol[1] | 29 mg. |
| Mannitol | 20 mg. |
| Talc | 19 mg. |
| Magnesium stearate | 2 mg. |
| Total | 590 mg. |

[1]A polyvinyl pyrrolidone product manufactured by Badische Anilin u. Sodafabrik, Ludwigshafen am Rhein, German Federal Republic.

The active ingredient was homogeneously blended with the LUVISKOL and mannitol and compressed into slugs. The slugs were then passed through a suitable sieving machine and, after blending with the talc and magnesium stearate, filled into suitable gelatin capsules.

EXAMPLE 14

Reconstitutable injectable preparations were prepared by forming a solution containing 263 mg. [(R)-1-[(2-isopropyl-2H-tetrazol-5-yl)-acetoxy]-3-methylbutyl]-penicillin sodium, 1.1 mg. p-hydroxybenzoic acid methyl ester and 0.135 mg. p-hydroxybenzoic acid propyl ester in each two ml., sterilizing said solution by sterile filtration, filling 2.0 ml. thereof aseptically into suitable ampules, lyophilizing the solution and hermetically sealing the ampules. In use, the lyophilized product is reconstituted with 2.0 of water for injection to a total volume of 2.2 ml.

We claim:

1. A compound represented by the formula

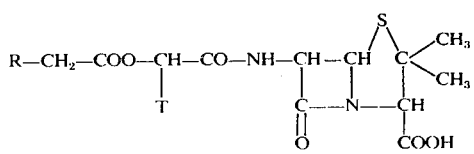

wherein R is selected from the group consisting of tetrazolyl, oxazolyl and isoxazolyl which can be substituted with halogen, $C_1$–$C_5$ alkyl, $C_1$–$C_3$ alkoxy of $C_1$–$C_3$ alkylthio and T is $C_2$–$C_5$ alkyl, pharmaceutically acceptable salts thereof and hydrates of said salts.

2. A compound in accordance with claim 1 wherein T is alkyl containing 4 or 5 carbon atoms.

3. A compound in accordance with claim 1 wherein T is isobutyl.

4. A compound in accordance with claim 1 wherein the group

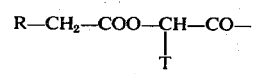

has the R configeration.

* * * * *